United States Patent
Suzuki et al.

(10) Patent No.: US 9,969,240 B2
(45) Date of Patent: May 15, 2018

(54) DOUBLE WISHBONE TYPE SUSPENSION DEVICE

(71) Applicant: Honda Motor Co., Ltd., Tokyo (JP)

(72) Inventors: Hiroyuki Suzuki, Wako (JP); Tuyoshi Funano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/460,719

(22) Filed: Mar. 16, 2017

(65) Prior Publication Data

US 2017/0267053 A1 Sep. 21, 2017

(30) Foreign Application Priority Data

Mar. 17, 2016 (JP) .................. 2016-053909

(51) Int. Cl.
  *B60G 21/055* (2006.01)
  *B60G 3/20* (2006.01)
  *B60G 7/00* (2006.01)

(52) U.S. Cl.
  CPC ........... *B60G 21/0551* (2013.01); *B60G 3/20* (2013.01); *B60G 7/008* (2013.01);
  (Continued)

(58) Field of Classification Search
  CPC .......... B60G 2200/156; B60G 21/0551; B60G 7/008; B60G 3/20; B60G 7/001;
  (Continued)

(56) References Cited

U.S. PATENT DOCUMENTS

| 4,681,342 A * | 7/1987 | Goerich | ................... B60G 3/26 |
| | | | 280/124.143 |
| 5,380,024 A * | 1/1995 | Hayami | ................... B60G 3/20 |
| | | | 280/124.138 |

(Continued)

FOREIGN PATENT DOCUMENTS

| JP | 3-050505 U | 5/1991 |
| JP | 11-91325 A | 4/1999 |
| JP | 2007-326529 A | 12/2007 |

OTHER PUBLICATIONS

Office Action dated Dec. 27, 2017, issued in counterpart Japanese Application No. 2016-053909, with English translation (6 pages).

*Primary Examiner* — Paul N Dickson
*Assistant Examiner* — Timothy Wilhelm
(74) *Attorney, Agent, or Firm* — Westerman, Hattori, Daniels & Adrian, LLP

(57) ABSTRACT

A lower arm 13 of a double wishbone type suspension device includes a substantially linear lateral arm 19 of which one end is connected to a vehicle body and the other end is connected to a knuckle 11 and a compression arm 20 of which one end is connected to the vehicle body and the other end is connected to a middle portion of the lateral arm 19 in the vehicle width direction, the lateral arm 19 is connected to a lower end of a stabilizer link 31 at the inside of a hole portion 19a opened to an upper surface of the lateral arm, and the other end of the compression arm 20 is connected to the lateral arm 19 at bifurcated portions 20a and 20b interposing the hole portion 19a from the inside and the outside in the vehicle width direction.

2 Claims, 3 Drawing Sheets

(52) U.S. Cl.
CPC .... *B60G 2200/156* (2013.01); *B60G 2200/34* (2013.01); *B60G 2204/143* (2013.01); *B60G 2204/148* (2013.01); *B60G 2204/422* (2013.01); *B60G 2204/61* (2013.01); *B60G 2206/124* (2013.01); *F16C 2326/05* (2013.01)

(58) Field of Classification Search
CPC ............ B60G 2204/61; B60G 2200/34; B60G 2204/143; B60G 2204/148; B60G 2206/122; B60G 2206/124; B60G 2204/422; F16C 2326/05
See application file for complete search history.

(56) References Cited

U.S. PATENT DOCUMENTS

| | | | | |
|---|---|---|---|---|
| 5,478,103 A * | 12/1995 | Maeda | .................... | B60G 7/001 267/273 |
| 6,446,991 B1 * | 9/2002 | Klais | .................... | B60G 7/02 280/124.134 |
| 7,270,340 B2 * | 9/2007 | Mosler | .................... | B60G 3/14 280/124.128 |
| 7,278,648 B2 * | 10/2007 | Bobbitt, III | ............. | B60G 7/003 280/124.123 |
| 7,703,782 B2 * | 4/2010 | Kiselis | .................... | B60G 7/001 280/124.133 |
| 8,056,912 B2 * | 11/2011 | Kawabe | .................... | B60G 3/20 280/124.135 |
| 8,267,416 B2 * | 9/2012 | Allen | .................... | B60G 3/20 280/124.135 |
| 8,342,542 B2 * | 1/2013 | Sagara | .................... | B60G 3/20 280/5.522 |
| 8,579,313 B2 * | 11/2013 | Lee | .................... | B60G 17/0162 280/124.106 |
| 8,596,647 B2 * | 12/2013 | Lee | .................... | B60G 17/0162 280/124.106 |
| 8,608,181 B2 * | 12/2013 | Lee | .................... | B60G 21/005 280/5.508 |
| 8,608,186 B2 * | 12/2013 | Lee | .................... | B60G 17/0162 280/124.106 |
| 8,746,705 B1 * | 6/2014 | Kim | .................... | B60G 7/001 280/124.149 |
| 8,746,714 B2 * | 6/2014 | Frens | .................... | B60G 7/003 280/86.753 |
| 8,794,647 B2 * | 8/2014 | Moessinger | ........... | B60G 7/008 280/124.138 |
| 8,827,288 B2 * | 9/2014 | Kuroda | .................. | B21D 53/88 280/124.107 |
| 9,004,511 B1 * | 4/2015 | Rosepiler | ........... | B60G 21/0551 280/124.109 |
| 9,216,624 B1 * | 12/2015 | Luttinen | .................. | B60G 3/20 |
| 9,278,603 B2 * | 3/2016 | Yoshizawa | ........... | B60G 21/055 |
| 9,358,851 B2 * | 6/2016 | Zandbergen | ............. | B60G 3/20 |
| 9,707,813 B2 * | 7/2017 | Randle | .................... | B60G 3/20 |
| 2006/0151970 A1 * | 7/2006 | Kaminski | ................ | B60G 3/06 280/124.134 |
| 2013/0341881 A1 * | 12/2013 | Koide | .................... | B60G 3/20 280/124.125 |
| 2015/0273963 A1 * | 10/2015 | Zandbergen | ............. | B60G 3/20 280/124.109 |

* cited by examiner

DOUBLE WISHBONE TYPE SUSPENSION DEVICE

CROSS-REFERENCE OF RELATED APPLICATION

This application claims priority of Japanese Patent Application No. 2016-053909 filed in Japan on Mar. 17, 2016, the entire contents of which are incorporated herein by reference.

TECHNICAL FIELD

The present invention relates to a double wishbone type suspension device which supports a knuckle by a vehicle body through an upper arm and a lower arm to be movable up and down and connects an arm portion of a stabilizer to the lower arm through a stabilizer link.

BACKGROUND OF THE INVENTION

Japanese Laid-Open Patent Publication No. H11-91325 discloses a configuration in which a lower arm of a double wishbone type suspension device includes a lateral arm of which both ends are respectively connected to a knuckle and a vehicle body and which extends in a vehicle width direction and a compression arm which extends obliquely backward from one end connected to a middle portion of the lateral arm in the vehicle width direction and of which the other end is connected to the vehicle body.

SUMMARY OF INVENTION

Incidentally, in the lower arm of the double wishbone type suspension device, when a lower end of a stabilizer link is connected to an upper surface of the linear lateral arm, a connection point of the lower end of the stabilizer link deviates upward from a line connecting a ball joint of an outer end of the lateral arm in the vehicle width direction to a ball joint of an inner end thereof in the vehicle width direction. For this reason, the lateral arm is twisted to rotate about the line due to a reaction load input from the lower end of the stabilizer link. As a result, there is a possibility that a posture of the lateral arm becomes unstable.

Here, a method can be considered in which a hole portion is formed at the upper surface of the lateral arm and the lower end of the stabilizer link is connected to the inside of the hole portion so that a connection point between the lateral arm and the lower end of the stabilizer link is located on the line. However, when the hole portion is formed at the upper surface of the lateral arm, there is a possibility that the rigidity of the lateral arm may be degraded due to the hole portion.

The present invention has been made in view of the above-described circumstances, and an object of the present invention is to prevent a twisting caused by a reaction load input from a stabilizer link without any degradation in rigidity of a lower arm of a double wishbone type suspension device.

In order to achieve the above object, according to an invention of claim 1, there is provided a double wishbone type suspension device which supports a knuckle by a vehicle body to be movable up and down through an upper arm and a lower arm and connects an arm portion of a stabilizer to the lower arm through a stabilizer link, wherein the lower arm includes a substantially linear lateral arm of which one end is connected to the vehicle body and the other end is connected to the knuckle and a compression arm of which one end is connected to the vehicle body and the other end is connected to a middle portion of the lateral arm in a vehicle width direction, and the lateral arm is connected to a lower end of the stabilizer link at the inside of the hole portion opened to an upper surface of the lateral arm and the other end of the compression arm is connected to the lateral arm at a bifurcated portion interposing the hole portion from the inside and outside in the vehicle width direction.

According to an invention of claim 2, in addition to the configuration of claim 1, there is provided the double wishbone type suspension device, wherein the bifurcated portion of the compression arm is connected to the lateral arm as interposing upper and lower surfaces of the lateral arm.

Additionally, the through-hole 19a of the embodiment corresponds to the hole portion of the present invention and the inner connection piece 20a and the outer connection piece 20b of the embodiment correspond to the bifurcated portion of the present invention.

EFFECT OF THE INVENTION

According to the configuration of claim 1, the double wishbone type suspension device is configured to support the knuckle by the vehicle body through the upper arm and the lower arm to be movable up and down and to connect the arm portion of the stabilizer to the lower arm through the stabilizer link. Since the lower arm includes the substantially linear lateral arm of which one end is connected to the vehicle body and the other end is connected to the knuckle and the compression arm of which one end is connected to the vehicle body and the other end is connected to the middle portion of the lateral arm in the vehicle width direction, the lateral arm is connected to the lower end of the stabilizer link at the inside of the hole portion opened to the upper surface of the lateral arm, and the other end of the compression arm is connected to the lateral arm at the bifurcated portion interposing the hole portion from the inside and the outside in the vehicle width direction, the connection point between the lateral arm and the lower end of the stabilizer link is located on the line connecting both ends of the lateral arm. Accordingly, it is possible to prevent a twisting of the lateral arm caused by a reaction load input from the lower end of the stabilizer link and also to ensure the rigidity of the lower arm by preventing degradation in rigidity of the lateral arm caused by the formation of the hole portion in terms of a reinforcement using the bifurcated portion of the compression arm. Further, since the interference between the hole portion and the bifurcated portion is prevented, a position of the hole portion, that is, a position of the lower end of the stabilizer link can be moved to the outside in the vehicle width direction as much as possible and thus an effect of the stabilizer can be effectively exhibited.

Further, according to the configuration of claim 2, since the bifurcated portion of the compression arm is connected to the lateral arm while the upper and lower surfaces of the lateral arm are interposed by the bifurcated portion, it is possible to further improve the rigidity of the connection portion between the lateral arm and the compression arm.

DETAILED DESCRIPTION OF THE INVENTION

Hereinafter, an embodiment of the present invention will be described with reference to FIGS. 1 to 3. Additionally, the longitudinal direction, the horizontal direction (the vehicle width direction), and the vertical direction of the specification are defined in a state where a passenger sits on a driver seat.

Figure 1:
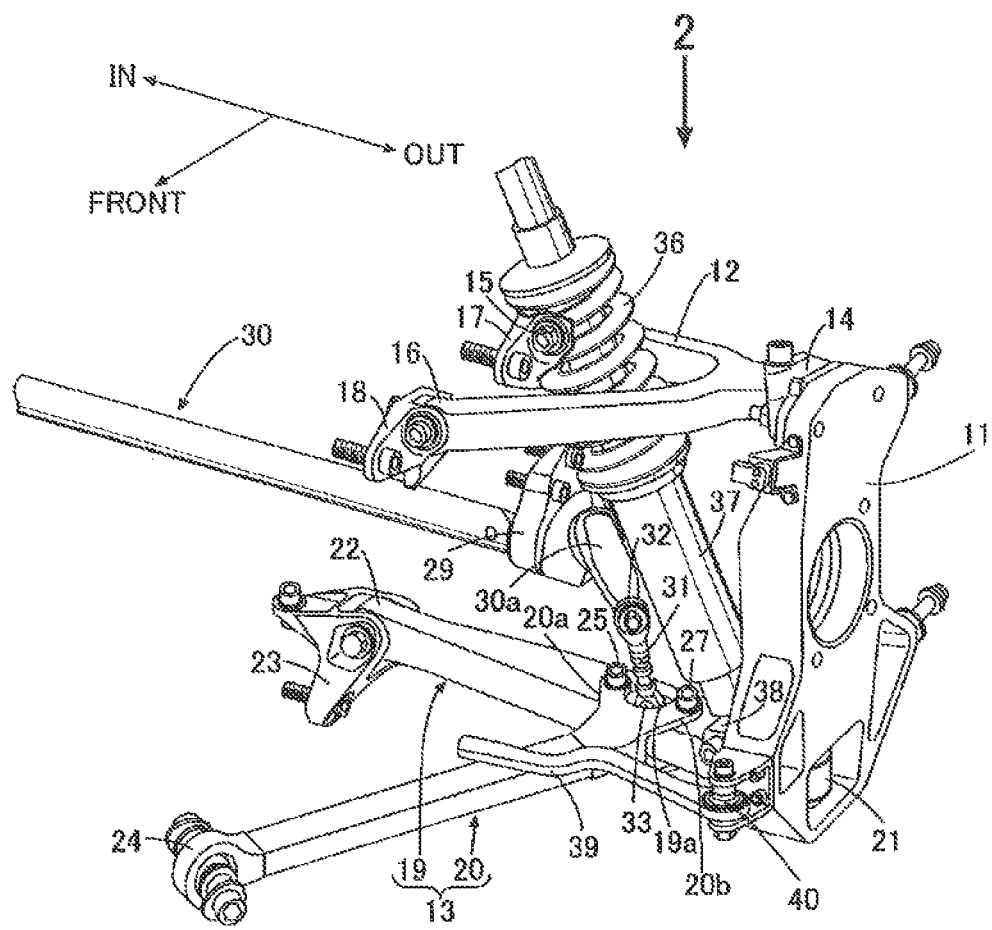
FIG. 1 is a perspective view of a double wishbone type suspension device of a left front wheel.
Figure 2:
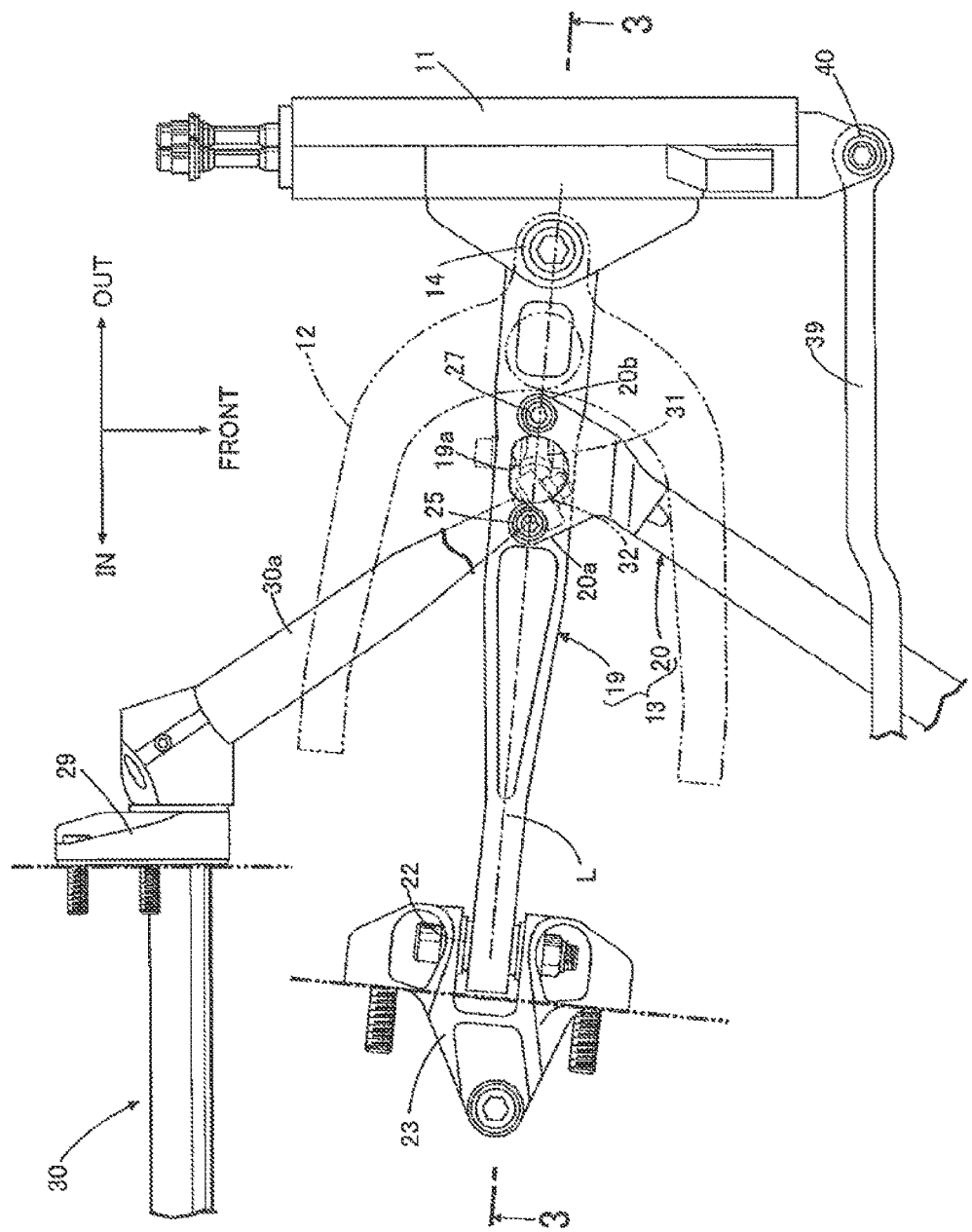
FIG. 2 is a diagram when viewed from a direction 2 of FIG. 1.
Figure 3:
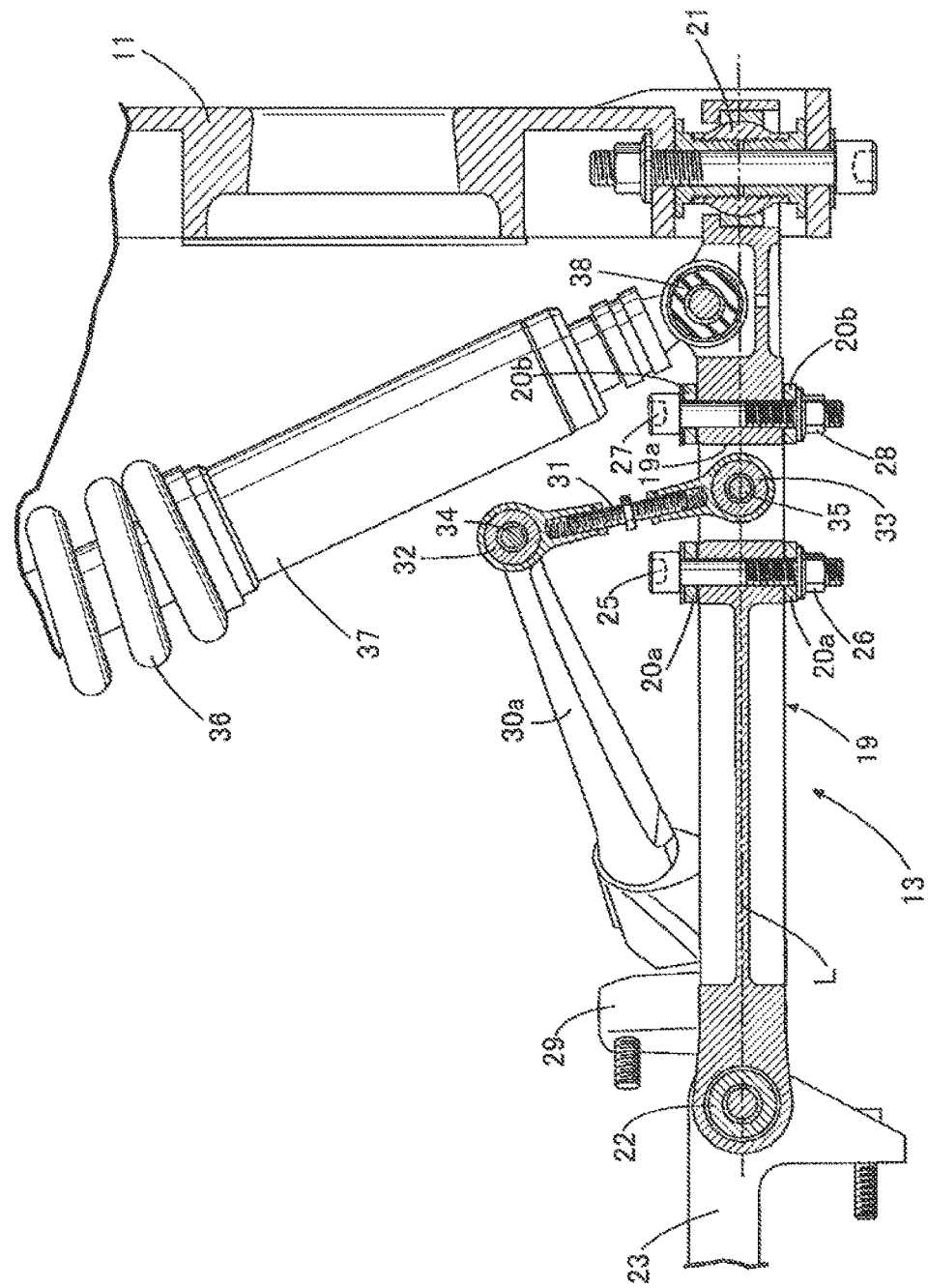
FIG. 3 is a cross-sectional view taken along a line 3-3 of FIG. 2.

As illustrated in FIGS. 1 to 3, a double wishbone type suspension device for suspending a left front wheel includes a knuckle 11 which supports a vehicle wheel to be rotatable, an upper arm 12 which supports an upper portion of the knuckle 11 by a front frame (not illustrated) to be swingable in the vertical direction, and a lower arm 13 which supports a lower portion of the knuckle 11 by the front frame to be swingable in the vertical direction. The upper arm 12 is a single member having a U-shape in the top view. Here, an outer end of the upper arm in the vehicle width direction is connected to the upper portion of the knuckle 11 through a ball joint 14, bifurcated inner ends of the upper arm in a vehicle width direction are respectively supported by a pair of longitudinal brackets 17 and 18 through ball joints 15 and 16, and the pair of longitudinal brackets 17 and 18 are fixed to the front frame.

The lower arm 13 has a configuration in which a lateral arm 19 extending linearly in the vehicle width direction is coupled to a compression arm 20 extending linearly from a middle portion of the lateral arm 19 in the vehicle width direction forward and inward in the vehicle width direction. An outer end of the lateral arm 19 in the vehicle width direction is connected to a lower portion of the knuckle 11 through a ball joint 21, an inner end of the lateral arm 19 in the vehicle width direction is supported by a bracket 23 through a ball joint 22, and the bracket 23 is fixed to the front frame.

An inner end of the compression arm 20 in the vehicle width direction is supported by a bracket (not illustrated) through a ball joint 24 and the bracket is fixed to the front frame. An outer end of the compression arm 20 in the vehicle width direction is provided with two vertical inner connection piece 20a and 20a and two vertical outer connection pieces 20b and 20b. Accordingly, the outer end of the compression arm 20 in the vehicle width direction is bifurcated inward and outward in the vehicle width direction in the top view and is bifurcated in the vertical direction in the side view.

A middle portion of the lateral arm 19 in the vehicle width direction is provided with a through-hole 19a which is formed in the vertical direction, two inner connection pieces 20a and 20a of the compression arm 20 are fitted to interpose the lateral arm 19 in the vertical direction at the inside of the through-hole 19a in the vehicle width direction and are fastened by a bolt 25 and a nut 26, and two outer connection pieces 20b and 20b of the compression arm 20 are fitted to interpose the lateral arm 19 in the vertical direction at the outside of the through-hole 19a in the vehicle width direction and are fastened by a bolt 27 and a nut 28.

An arm portion 30a extends forward and outward in the vehicle width direction from an outer end of a stabilizer 30 which is disposed in the vehicle width direction and is supported by a pair of left and right brackets 29 and 29 to be rotatable and a front end of the arm portion 30a is connected to the lateral arm 19 by a stabilizer link 31. That is, a ball joint 32 fixed to a front end of the arm portion 30a by a bolt 34 and a ball joint 33 fixed to the lateral arm 19 inside the through-hole 19a by a bolt 35 are respectively connected to upper and lower ends of the stabilizer link 31. When the ball joint 22 at the inner end of the linear lateral arm 19 in the vehicle width direction and the ball joint 21 at the outer end thereof in the vehicle width direction are connected to each other by a virtual line L, the ball joint 33 at the lower end of the stabilizer link 31 is located on the line L (see FIG. 3).

A lower end of a damper 37 of which an upper portion is provided with a suspension spring 36 is connected to the vicinity of the outer end of the lateral arm 19 in the vehicle width direction through a ball joint 38. Further, an outer end of a control arm 39 extending in the vehicle width direction is connected to a front portion of the knuckle 11 through a ball joint 40.

Next, an action of the embodiment of the present invention with the above-described configuration will be described.

When the vehicle wheel moves up and down by an unevenness of a road, the upper arm 12 and the lower arm 13 supporting the knuckle 11 move up and down with respect to the vehicle body and the suspension spring 36 and the damper 37 connected to the lower arm 13 move in a telescopic manner in order to reduce and absorb the vertical movement of the vehicle wheel. When the left and right vehicle wheels move up and down at a different phase, the stabilizer 30 of which the arm portion 30a and 30a are connected to the left and right lower arms 13 and 13 through the stabilizer links 31 and 31 are twisted and a phase difference between the left and right vehicle wheels is reduced due to a repulsive force in which the stabilizer 30 tries to return to an original state, whereby a rolling movement of the vehicle body is suppressed.

Incidentally, the lateral arm 19 of the lower arm 13 connected to the lower end of the stabilizer link 31 is a linear member, an inner end of the lateral arm in the vehicle width direction is connected to the vehicle body through the ball joint 22, and an outer end of the lateral arm in the vehicle width direction is connected to the knuckle 11 through the ball joint 21. For this reason, when the lower end of the stabilizer link 31 is connected to a position deviating from the line L (see FIG. 3) connecting the ball joint 22 and the ball joint 21, the lateral arm 19 is twisted to rotate about an axis line L by a reaction load input from the lower end of the stabilizer link 31. Accordingly, there is a possibility that the posture of the lateral arm 19 becomes unstable.

However, according to the embodiment, since the ball joint 33 of the lower end of the stabilizer link 31 is connected to the inside of the through-hole 19a formed in the lateral arm 19, the connection portion can be disposed on the axis line L. Accordingly, since there is no concern that the lateral arm 19 is twisted by the reaction load input from the lower end of the stabilizer link 31, the posture of the lateral arm 19 becomes stable.

Further, when the through-hole 19a is formed at the lateral arm 19, there is a possibility that the rigidity of the lateral arm 19 at the portion may be degraded. However, the end of the compression arm 20 connected to the lateral arm 19 is bifurcated as the inner connection pieces 20a and 20a at the inside of the vehicle width direction and is bifurcated as the outer connection pieces 20b and 20b at the outside of the vehicle width direction and the bifurcated portions are fastened by the bolts 25 and 27 and the nuts 26 and 28 so that the through-hole 19a of the lateral arm 19 is interposed from the inside and the outside in the vehicle width direction. Accordingly, since the periphery of the through-hole 19a is effectively reinforced, it is possible to ensure the rigidity of the lower arm 13 while suppressing an increase in weight as small as possible.

Further, since the inner connection pieces 20a and 20a and the outer connection pieces 20b and 20b of the compression arm 20 are all bifurcated in the vertical direction and are fastened to the lateral arm 19 so as to interpose upper and lower surfaces thereof by the bolts 25 and 27 and the nuts 26 and 28, the periphery of the through-hole 19a is more effectively reinforced.

Further, in order to effectively exhibit an effect of largely twisting the stabilizer 30, it is desirable to connect the lower end of the stabilizer link 31 to a position near the outer end of the lateral arm 19 in the vehicle width direction and having a large vertical stroke. However, according to the embodiment, since the through-hole 19a is formed at a portion where the compression arm 20 is connected to the lateral arm 19 and the lower end of the stabilizer link 31 is connected to the inside of the through-hole 19a, a position of the through-hole 19a is freely set without any interference with the compression arm 20 and thus a position of a connection point of the lower end of the stabilizer link 31 can be set to be near the outer end in the vehicle width direction.

While the embodiment of the present invention has been described, various modifications in design can be made without departing from the spirit of the present invention.

For example, in the embodiment, the suspension device of the front wheel has been exemplified, but the present invention can be also applied to the suspension device of the rear wheel.

Further, the through-hole 19a of the embodiment is formed to penetrate the lateral arm 19 in the vertical direction. However, the hole portion of the present invention may not be essentially formed to penetrate the lateral arm in the vertical direction, but may be opened to an upper surface of the lateral arm.

DESCRIPTION OF REFERENCE NUMERALS 11 knuckle
12 upper arm
13 lower arm
19 lateral arm
19a through-hole (hole portion)
20 compression arm
20a inner connection piece (bifurcated portion)
20b outer connection piece (bifurcated portion)
30 stabilizer
30a arm portion
31 stabilizer link

The invention claimed is:

1. A double wishbone suspension device comprising:
an upper arm;
a lower arm;
a knuckle supported by a vehicle body through the upper arm and the lower arm so as to be movable up and down; and
a stabilizer having an arm portion and a stabilizer link, a lower end of the stabilizer link being connected to said lower arm such that the arm portion of the stabilizer is connected to the lower arm through the stabilizer link,
wherein said lower arm comprises
a substantially linear lateral arm of which one end is connected to the vehicle body and another end is connected to the knuckle, the substantially linear lateral arm at its middle portion in a vehicle width direction having a hole opened to an upper surface thereof, the lower end of the stabilizer link being inserted and connected to the substantially linear lateral arm inside the hole, and
a compression arm of which one end is connected to the vehicle body and another end is connected to the middle portion of said lateral arm, the another end having a bifurcated portion with two ends each connected to the middle portion of said lateral arm such that said hole is located between the two ends in the vehicle width direction.

2. The double wishbone suspension device according to claim 1,
wherein the bifurcated portion of said compression arm is connected to both upper and lower surfaces of said lateral arm.

* * * * *